(12) United States Patent
Giudicelli et al.

(10) Patent No.: US 10,690,914 B2
(45) Date of Patent: Jun. 23, 2020

(54) OPTICAL PROJECTION DEVICE FOR DISPLAY MEANS SUCH AS AUGMENTED REALITY GLASSES

(71) Applicant: Commissariat a L'Energie Atomique et aux Energies Alternatives, Paris (FR)

(72) Inventors: Sebastien Giudicelli, Grenoble (FR); Stephane Getin, Grenoble (FR)

(73) Assignee: Commissariat a L'Energie Atomique et aux Energies Alternatives, Paris (FR)

(*) Notice: Subject to any disclaimer, the term of this patent is extended or adjusted under 35 U.S.C. 154(b) by 803 days.

(21) Appl. No.: 14/972,539

(22) Filed: Dec. 17, 2015

(65) Prior Publication Data

US 2016/0178910 A1    Jun. 23, 2016

(30) Foreign Application Priority Data

Dec. 19, 2014 (FR) .................................. 14 62844

(51) Int. Cl.
  *G02B 27/01*  (2006.01)
  *G02B 27/30*  (2006.01)
  *G02B 5/32*   (2006.01)

(52) U.S. Cl.
  CPC .......... *G02B 27/0172* (2013.01); *G02B 27/30* (2013.01); *G02B 5/32* (2013.01);
  (Continued)

(58) Field of Classification Search
  CPC ..... G02B 27/01–019; G02B 2027/0105–0198; G02B 5/32;
  (Continued)

(56) References Cited

U.S. PATENT DOCUMENTS

| 6,577,411 B1* | 6/2003 | David .................... G02B 3/10 351/159.41 |
| 8,098,439 B2* | 1/2012 | Amitai ................... G02B 13/22 345/7 |

(Continued)

FOREIGN PATENT DOCUMENTS

| EP | 2 808 725 A1 | 12/2014 |
| WO | WO 2014/188149 A1 | 11/2014 |

OTHER PUBLICATIONS

French Preliminary Search Report issued Oct. 14, 2015 in French Application 14 62844, filed Dec. 19, 2014 (with English Translation of Categories of Cited Documents).

(Continued)

*Primary Examiner* — William R Alexander
(74) *Attorney, Agent, or Firm* — Oblon, McClelland, Maier & Neustadt, L.L.P.

(57) ABSTRACT

An optical projection device for a display such as augmented reality glasses. The optical system includes a planar optical guide; at least two input optics; at least two collimation elements, each being associated with an input optics, and directly located on a face of the planar optical guide; and conjugation device, arranged to conjugate in twos an input optics and the associated collimation element. The invention provides a wide field and compact offset projection device.

16 Claims, 6 Drawing Sheets

(52) U.S. Cl.
CPC ............... *G02B 2027/0123* (2013.01); *G02B 2027/0174* (2013.01); *G02B 2027/0178* (2013.01)

(58) Field of Classification Search
CPC ............... G02B 27/0172; G02B 27/30; G02B 2027/0123; G02B 2027/0174; G02B 2027/0178
USPC ........................................................ 359/633
See application file for complete search history.

(56) References Cited

U.S. PATENT DOCUMENTS

| | | | | |
|---|---|---|---|---|
| 8,189,263 | B1* | 5/2012 | Wang | G02B 27/0172 359/630 |
| 8,548,290 | B2* | 10/2013 | Travers | G02B 27/0081 385/37 |
| 8,666,208 | B1* | 3/2014 | Amirparviz | G02B 27/0172 385/31 |
| 8,760,762 | B1* | 6/2014 | Kelly | G02B 21/18 345/7 |
| 8,767,305 | B2* | 7/2014 | Spitzer | G02B 27/0172 359/630 |
| 8,786,686 | B1* | 7/2014 | Amirparviz | G02B 27/017 348/58 |
| 8,817,350 | B1* | 8/2014 | Robbins | G02B 5/1828 345/7 |
| 2003/0210467 | A1* | 11/2003 | Song | G02B 27/0172 359/630 |
| 2004/0004767 | A1* | 1/2004 | Song | G02B 27/0081 359/566 |
| 2004/0247240 | A1* | 12/2004 | Teramura | G02B 6/4206 385/27 |
| 2008/0043334 | A1* | 2/2008 | Itzkovitch | G02B 5/1814 359/569 |
| 2011/0019250 | A1* | 1/2011 | Aiki | G02B 5/32 359/15 |
| 2014/0218779 | A1* | 8/2014 | Mukawa | G02B 27/0081 359/15 |

OTHER PUBLICATIONS

Y. Amitai et al. "Visor-Display Design Based on Planar Holographic Optics", Applied Optics, vol. 34, No. 8, Mar. 10, 1995, 5 pages.

\* cited by examiner

OPTICAL PROJECTION DEVICE FOR DISPLAY MEANS SUCH AS AUGMENTED REALITY GLASSES

TECHNICAL FIELD

The present invention relates to an optical projection device, for display means mounted to a user's head and for providing him with an offset vision. The aim is in particular to offset to a large part of the field of view of the user, an image from a miniature screen. Such display means are for example augmented reality glasses or helmet, enabling the projection of an image from the miniature screen and the image of the external environment to be superimposed in transparency.

STATE OF PRIOR ART

In prior art, such so-called catadioptric optical projection devices are known, implementing reflective and refractive elements. These catadioptric systems can offer a very wide field of view, but have a very significant overall space.

In order to overcome this drawback, optical projection devices implementing a planar light guide are known.

A planar light guide implements conveying a light beam by successive reflections within the guide. The light guide enables the light beam path to be folded at each internal reflection. The guide is referred to as planar, because it has two opposite main faces parallel to each other. It typically has the parallelepiped shape of a plate. Alternatively, the main faces can be curved, still in parallel to each other. The height of the plate substantially corresponds to the height of the miniature display. The width of the plate is substantially equal to the sum of the width of the miniature screen and the desired propagation length of the light beam from the miniature display. As in an optical fibre, reflections within the guide are related to an index difference between the inside and the outside of the guide, and a condition relating to the beam incidence angle, on each interface between the inside and the outside of the guide.

Figure 1:
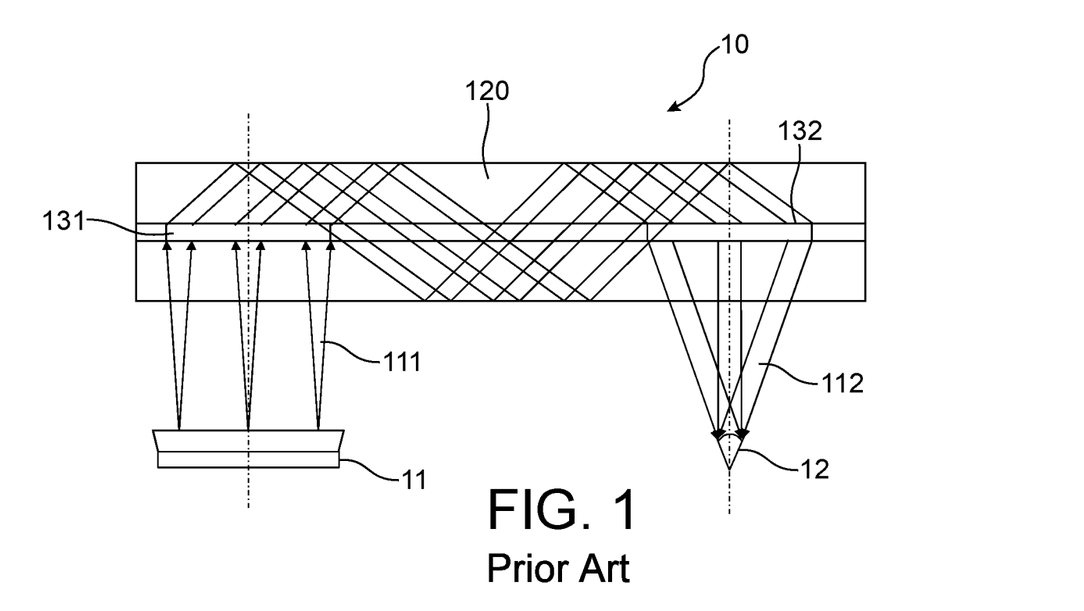
FIG. 1 schematically illustrates an optical projection system according to prior art.

One example of a projection device by means of a planar optical guide has been described in the paper of Y. Amitai et al. entitled "Visor display design based on planar holographic optics", published in Applied Optics, Vol. 34, No. 8, pp. 1352-1356 and has been schematically represented in FIG. 1. This projection device 10 comprises herein a holographic plate 120, playing the role of a planar optical guide. A first holographic element 131, integrated in the guide, plays a role of collimation and deflection of the incident beams 111. The beams thus collimated and deflected are guided by means of the planar optical guide up to a second holographic element 132, also integrated in the guide. The second holographic element diffracts the different beams to the observer's eye, 12. It is noticed that the projection device has aberrations which are all the more significant that the field of view of the observer is extended. Indeed, the beams 112 at the edge of the field of view correspond to incident beams 111 which are not centred on the optical axis $A_1$. To avoid these aberrations, a reduced viewing field is consequently provided.

By increasing the optical index of the optical guide, this field can indeed be increased without worsening the aberrations, but a field of 20° is hardly exceeded, corresponding to a high index equal to 2.

One purpose of the present invention is to provide an optical projection device for display means such as augmented reality glasses, which offers both a reduced overall space and a wide output field of view, typically higher than 20°, reaching for example 40° and even 60°.

DISCLOSURE OF THE INVENTION

This purpose is achieved with an optical projection device for display means such as augmented reality glasses, comprising an optical guide, the optical projection device comprising:
- at least two refractive input optics, arranged in front of an input zone of the optical guide;
- at least two collimation elements having a deflection function, each collimation element being associated with an input optics, and located directly on a face of the optical guide; and
- conjugation means disposed between the input optics and the collimation elements, arranged to optically conjugate in twos an input optics and the associated collimation element.

The conjugation means and the collimation elements are each located directly on a face of the optical guide.

The input zone is for example located on a first face of the optical guide and the collimation elements, which are at least partly reflecting, are then located on a second face of the optical guide opposite to this first face.

The conjugation means advantageously comprise at least two conjugation elements, each associated with an input optics and a collimation element.

The conjugation element is an element chosen from a hologram, a diffraction grating, a mirror or a Fresnel lens, a lens or a non-plane mirror.

Preferably, the conjugation means are arranged to deflect light beams that have passed through the input optics, so as to initiate the guiding thereof in the optical guide.

Likewise, the collimation elements are arranged to deflect, off the optical guide, light beams that have passed through the input optics and the conjugation means, and that have propagated in the optical guide.

Each collimation element is an element chosen from a hologram, a diffraction grating, a mirror or a Fresnel lens, a lens or a non-plane mirror.

According to an alternative, the conjugation means operate in transmission and are located between the input optics and a first face of the optical guide, or directly on this first face, said input zone being located on said first face.

In this case, the collimation elements are for example located directly on a face of the optical guide.

Likewise, the collimation elements are arranged to deflect the light beams that have passed through the input optics and the conjugation means, so as to initiate the guiding thereof in the light guide.

The conjugation means can comprise at least two microlenses, each associated with an input optics.

Alternatively, the conjugation means consist of a single lens common to each of the input optics.

Finally, the optical device can further comprise decoupling components located on a face of the optical guide and arranged to deflect, off the optical guide, light beams that have passed through the input optics, the conjugation means and the collimation means, and that have propagated in the optical guide.

The invention also relates to a an optical projection system comprising an optical projection device as defined above, as well as a screen composed of a plurality of unit screens, each unit screen being associated with an input optics and with the corresponding collimation element, and each unit screen being arranged such that:

the optical guide performs propagation of light beams from each of the unit screens; and each collimation element performs the collimation of a light beam from a unit screen, and that has passed through the associated input optics and the conjugation means.

BRIEF DESCRIPTION OF THE DRAWINGS

The present invention will be better understood upon reading exemplary embodiments given by way of purely indicating and in no way limiting purposes, by making reference to the appended drawings in which.

DETAILED DISCLOSURE OF PARTICULAR EMBODIMENTS

Figure 2:
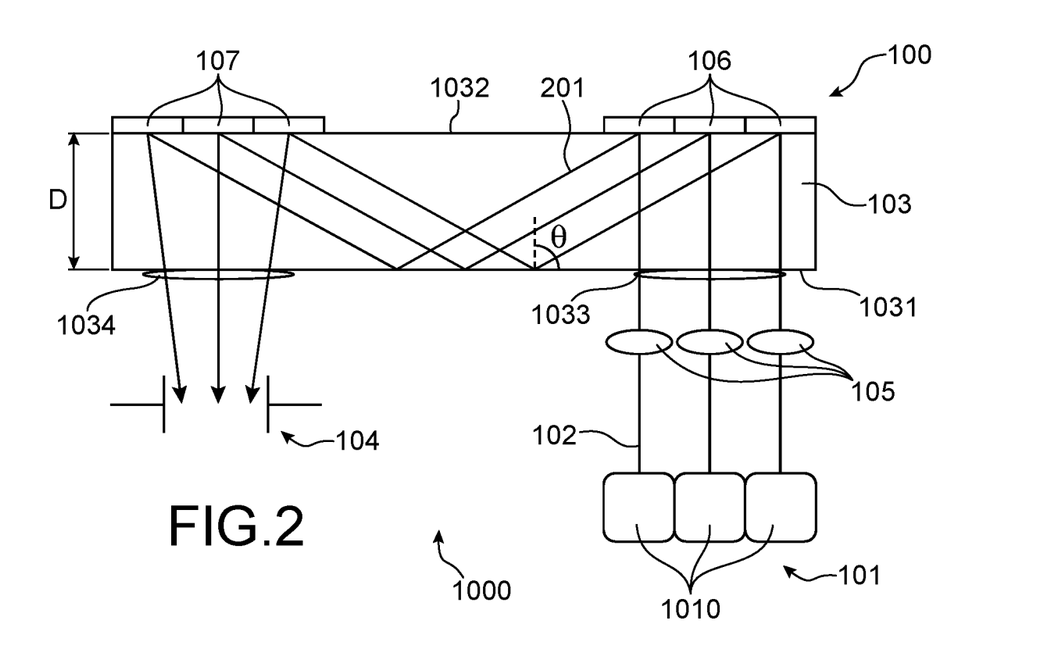
FIG. 2 illustrates a first embodiment of an optical projection device and system according to the invention.

FIG. 2 illustrates a first embodiment of an optical projection device 100 and system 1000 according to the invention. The optical projection device 100 is suitable for being integrated in display means such as augmented reality glasses. For this, it has a reduced overall space, typically lower than 100 cm³.

The optical projection device 100 according to the invention corresponds to the projection function only. An optical projection system 1000 according to the invention is also defined, comprising the optical projection device 100 as well as a screen 101 providing data to be projected using the device 100.

The screen 101 comprises several unit screens 1010. In the example represented in FIG. 2, the screen 101 consists of three unit screens 1010.

The unit screens 1010 can be independent screens disposed adjacent to each other or spaced apart from each other. A high number of pixels is thus easily available, thus enabling the optical system 1000 to offer a comfortable definition for a regular human eye (in the order of 0.3 mrad/pixel).

Alternatively, the unit screens simply are zones defined on the screen 101. For example, the surface of the screen 101 is divided into several zones each forming a unit screen 1010.

The screen 101 is typically a high definition screen. The screen 101 provides an image to be projected to a user's eye. It is typically a liquid crystal display (LCD) screen, or liquid crystal on silicone (LCOS) screen, or a light emitting diodes (LED) screen, or an organic light emitting diode (OLED) screen, or a so-called DLP ("Digital Light Processing") technology screen. The size of the pixels typically ranges from 1 μm to 10 μm, for a total width of the screen in the order of about ten mm, for example 1.6" in diagonal.

The optical device 100 comprises a planar optical guide 103. This guide has a first so-called input zone 1033, located on a first face 1031, and an output zone 1034. In the case illustrated, the output zone is also located on the first face 1031. Alternatively, it could be located on a second face 1032, opposite to the first face. The faces 1031 and 1032 are parallel to each other (and preferably planar). The faces 1031 and 1032 are spaced apart from each other by a distance D called a thickness of the light guide (planar optical guide), and typically between 10 μm to 10 mm. The light guide is for example of glass or polymer. The light guide 103 is arranged to perform the propagation of light beams provided by the unit screens 1010, to a location suitable for receiving the pupil 104 of a user's eye.

The optical device 100 also comprises:

several input optics 105, located outside the light guide and in front of the input zone 1033;

for each input optics, a collimation element 107, bounded to the light guide 103 and located directly on a face thereof (here the face 1032); and conjugation means located between the input optics 105 and the collimation elements 107. The conjugation means here consist of several conjugation elements 106, each associated with an input optics 105 and a collimation element 107.

In the optical system 1000 according to the invention, each unit screen 1010 is associated with:

an input optics 105, located between this unit screen 1010, and the input zone 1033 of the light guide; and a conjugation means 106;

a collimation element 107.

The conjugation means perform conjugation of an input optics and the associated collimation element (called conjugation in twos). Thus, they have an optical power function.

Each assembly comprising an input optics 105 and the associated collimation element 107 defines a unit projector according to the invention. A unit projector further comprises the conjugation element 106 associated with the same input optics (or optionally a portion of a single lens forming the conjugation means, this portion being associated with those same input optics).

The input optics 105 forms the entrance pupil of the unit projector. The collimation element 107 forms the exit pupil of the unit projector. By "pupillary conjugation", it is therefore meant the conjugation performed between the elements 105 and 107 via the elements 106.

Each unit screen 1010 is associated with a unit projector. Each assembly comprising a unit screen and the associated unit projector defines a unit system according to the invention.

According to the invention, the multiplication of the unit projectors enables the total field of view at the output of the optical device according to the invention to be multiplied, while using a single light guide. Light guides having a lower index can be used, and the theoretical field loss associated with this lowered index can be compensated for by the use of these several unit projectors.

The integrity of the field as well as the quality of the image seen by the eye are kept thanks to the pupillary conjugation between each input optics and the associated collimation element.

The resolution of the image formed at the output of a unit projector is related to the number of pixels on each corresponding unit screen. A very good resolution is thus readily achieved, this number of pixels not being a limiting factor.

The optical device made is particularly compact, because it implements a single light guide. Further, at least one part of the optical power functions is integrated on this light guide which makes it possible to further gain in compactness. In particular, the collimation elements 107 are integrated on the light guide.

According to the first embodiment of a device and system as illustrated in FIG. 2, each unit projector corresponds to a portion of the total field at the output of the device according to the invention. With each unit projector, is associated a unit field of X°, limited by the light guide, typically lower than 20°. Thus, the total field offered to the eye, at the output of the device, according to the invention is N*X°, N being the number of the unit projectors, N being higher than or equal to 2. The invention readily enables a total field of at least 40°, for example 60° or more, to be readily achieved, at the output of the device according to the invention. By "channel", it can be meant the optical path associated with a unit field. In the example represented in FIG. 2, each unit projector is associated with a channel.

Each input optics 105 is formed by a lens, typically of glass or polymer, being lathe-cut or moulded. Its focal length is for example in the order of 25 mm, and its diameter of about 4 mm. Each input optics 105 has an optical power function, and thus takes part in the optical projection combination of a unit screen 101 to the eye pupil.

In the example represented in FIG. 2, the conjugation elements 106 are found on the second face 1032 of the light guide, opposite to the first face 1031. In particular, the conjugation elements 106 are located in front of the input optics, such that the light beam 102 from a unit screen and incident on the corresponding conjugation element 106 has only passed through an input optics, and then has propagated from the face 1031 to the face 1032 of the optical guide.

The conjugation elements 106 operate in reflection, in particular a total reflection.

Each conjugation element 106 is arranged to deflect a light beam 102 that has passed through the associated input optics 105. This beam comes from the corresponding unit screen 1010.

Each conjugation element 106 thus has a deflection function, further to its optical power function. Said deflection enables the light beam 102 incident on the conjugation element 106 to be tilted at a desired angle. In particular, this deflection tilts the light beam 102 such that the resulting beam is wholly reflected inside the light guide. The conditions for such an internal reflection are determined by the Snell-Descartes laws. The guiding of the light beam 102 inside the optical guide 103, by successive reflections between the faces 1031 and 1032, is thus initiated.

The conjugation elements 106 all advantageously perform the same deflection.

According to an alternative not represented, a distinct component of the conjugation means performs the deflection function. This distinct component can be superimposed with the conjugation means, or be disjoint such that this component and the conjugation means are located at different locations on the light guide. This distinct component is always advantageously located on the face 1032 of the light guide, in front of the input optics.

Each conjugation element 106 typically has a focal length of about 10 mm, and a diameter of about 10 mm.

Each conjugation element 106 consists for example of a hologram formed in the light guide or bonded on the face 1032. Such a hologram is also called a holographic lens. It is a lens in which holographic techniques for printing interference fringes are used, to achieve the desired diffraction properties. One advantage of such a lens is that it has a reduced thickness. According to the embodiment of FIG. 2, the hologram operates at least partly in reflection.

Each conjugation element 106 can also consist of a reflection diffraction grating (in particular a variable pitch blazed diffraction grating), a Fresnel mirror (mirror based on the principle of the Fresnel lens), or a spherical or aspherical mirror (typically obtained by moulding or embossing). One advantage of resorting to a Fresnel mirror or any other non-plane mirror is that polychromatic light beams 102 can be easily propagated in the light guide.

According to an alternative not represented, the conjugation elements 106 are located on the face 1031 and operate in transmission. Therefore, they consist of elements such as a transmission diffraction grating, a (off axis) lens, a (off axis) Fresnel lens or even a hologram operating in transmission.

Each collimation element 107 receives a light beam that has passed through the associated input optics 105. According to the embodiment represented in FIG. 2, the light beam received by a collimation element 107 has propagated in the light guide 103.

Each collimation element receives said light beam, and outputs a collimated beam, that is such that the light rays forming the "field beam" are parallel to each other. Each collimation element 107 thus has an optical power function.

According to the embodiment of FIG. 2, the collimation elements 107 are in front of a location provided for a user's eye. Thus, a distance separating the eye and the last surface of the device according to the invention which has an optical power function (this is called "eye-relief" distance) is limited. But, the number of apertures associated with an optical device is equal to the ratio of the focal length to the diameter of the pupil of this optical device. It can be shown that by decreasing the eye-relief distance, this pupil diameter is decreased and thus the number of apertures is increased. Thus, each unit projector as illustrated in FIG. 2 has a high number of apertures, which corresponds to a lesser complexity.

In the example represented in FIG. 2, the collimation elements 107 are on the second face 1032 of the light guide, opposite to the first face 1031. They operate in reflection. Here, this is an at least partial reflection, in intensity or in wavelength, especially in the case where the device 100 according to the invention belongs to augmented reality glasses or helmet. Thus, the collimation elements 107 enable at least one part (for example at least one half) of the light intensity emitted by a unit screen to be reflected, without blocking rays from the light guide side opposite to the screen. Thereby, they ensure the superimposition of an image from the screen and an image from the outside environment.

Each of the collimation elements 107 is herein arranged to deflect a light beam 102 that has passed through the corresponding input optics 105 and the conjugation means, and that has propagated in the light guide 103. This beam comes from the corresponding unit screen 1010. Each collimation element 107 thus has a deflection function, further to its optical power function. Said deflection makes it possible to tilt, at a desired angle, the light beam 102 that has propagated in the optical guide. In particular, this deflection tilts the light beam 102 such that the resulting beam passes through the face 1031 and comes out of the light guide. Once again, the conditions for such an output off the guide are determined by the Snell-Descartes laws. Thereby, the output of the light beam 102 off the light guide 103 is initiated. Each beam is typically deflected by an angle between 30° and 60° relative to its incidence in the absence of deviation, for example 60°.

The collimation elements 107 deviate the beams that have passed through the input optics, such that these different beams are all directed to a location provided for a user's eye. In particular, these different beams pass through a surface located off the light guide, corresponding to the surface of the pupil 104 of a user's eye. This surface is a disk having an area in the order of one $cm^2$ (for example a disk with a diameter of 5 mm). The beams come from different unit screens.

According to an alternative not represented, a distinct component of the collimation element 107 performs the deflection function. This distinct component can be superimposed with the collimation element, or disjoint such that this component and the collimation elements are located at different locations on the light guide. This distinct component is still advantageously located on the face 1032 of the light guide, in front of the location provided for the eye pupil.

The collimation elements are preferably edge-to-edge.

Each collimation element 107 typically has a focal length of about 15 mm, and a diameter of about 10 mm.

Each collimation element 107 consists for example of a hologram formed in the light guide or bonded on the face 1032. According to the embodiment of FIG. 2, the hologram operates in an at least partial reflection. Such a hologram typically offers an efficiency higher than 80% at its working wavelength (and on a spectral width of about 15 nm about this wavelength).

Each collimation element 107 can also consist of a reflection diffraction grating, in particular a variable pitch blazed diffraction grating, a Fresnel mirror, or a spherical or aspherical mirror typically obtained by moulding or embossing.

According to an alternative not represented, the collimation elements 107 are located on the face 1031 and operate in transmission. Thereby, they consist of elements such as a transmission diffraction grating, a (off axis) lens, a (off axis) Fresnel lens, or even a hologram operating in transmission. The collimation elements 107 and the conjugation elements 106 are not necessarily on the same face 1031 or 1032 of the optical guide.

Figure 3A:
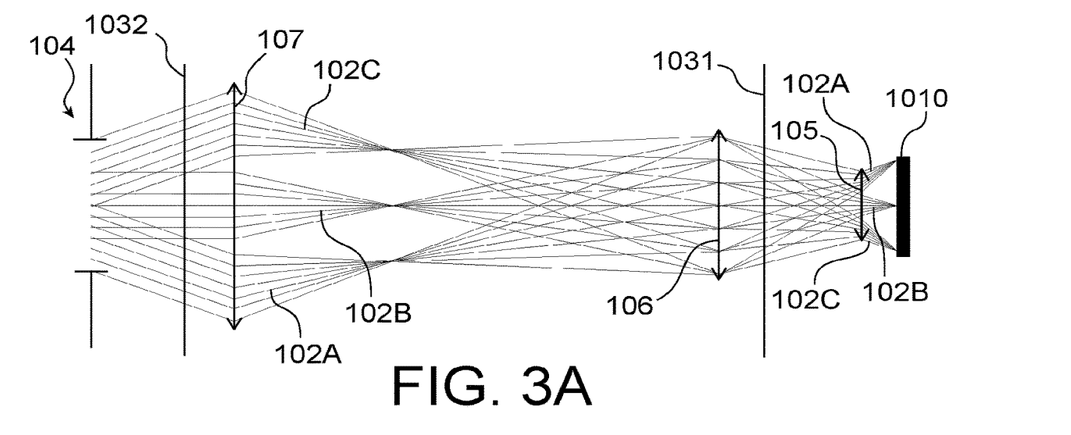
FIGS. 3A and 3B schematically illustrate light ray paths in a part of an optical system according to FIG. 2.
Figure 3B:
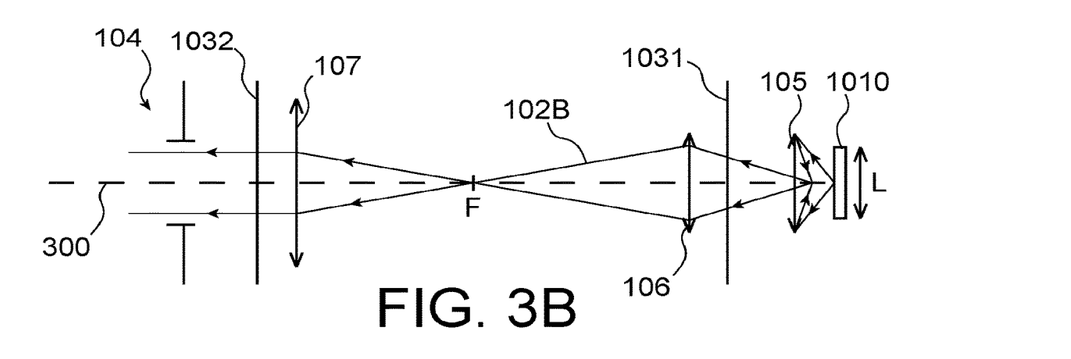

FIGS. 3A and 3B schematically illustrate light ray paths in a part of an optical device as represented in FIG. 2. FIGS. 3A and 3B represent a single unit projector and unit system.

In FIGS. 3A and 3B, the optical path traveled by the light beams inside the light guide has been unfolded.

It is represented a face 1031, corresponding to the light beams from the screen passing through the face 1031 of the optical guide (for the sake of simplification, the optical index of the light guide has been herein set to 1), and a face 1032, corresponding to the face of the light guide passed through when the light beam comes out of the light guide to be propagated to a user's eye.

FIG. 3A represents three light beams 102A, 102B, 102C respectively from the upper edge, the centre and the lower edge of the unit screen 1010.

FIG. 3B illustrates in further detail the different conjugations implemented in a unit system according to the invention.

The optical axis 300 is represented in dotted line. The unit screen 1010 is herein imaged by the input optics 105 in a virtual intermediate image, located on the same side of the input optics 105 as the unit screen 1010. This virtual image is then conjugated by the conjugation element 106, at the focus F of the collimation element 107. The collimation element 107 thus provides a collimated beam passing through the eye pupil 104. In FIG. 3B, the difference between the incidence angle of the beam 102B on the input optics 105, and the incidence angle of the same beam on the conjugation element 106 and after passing through the input optics 105 is strongly exaggerated for the sake of clarity.

Those skilled in the art will be readily capable of determining particular materials and dimensions for each of the elements of the optical device and the optical system according to the invention. They could for example set some parameters, and then deduce therefrom all the other parameters enabling the invention to be made. The parameters to be set are for example the size and location provided for the eye pupil, the index of the light guide, the desired number of apertures of the optical device according to the invention, the positioning of the input optics and the collimation elements on the light guide (for example on the face 1032, spaced by a predetermined distance) as well as their powers.

The following relationships can then be used:
- the distance between the location provided for the eye pupil and the collimation elements 107 corresponds to the eye-relief distance;
- the diameter of a collimation element 107 is calculated from the eye-relief distance, the size of the eye pupil, and of the field associated with a unit projector;
- the distance between the conjugation element 106 and the collimation element 107, when each has a deflection function, is related to the thickness of the guide and the number of internal reflections within this guide;
- the focal distance of the collimation element 107 can be adjusted by its diameter (previously calculated) and its number of apertures (which is a function of its nature: hologram, grating or Fresnel optics, etc.);
- the focal distance of the conjugation elements 106 is defined by setting the distance between the collimation elements and the input optics;
- the position and the focal length of the input optics are determined by the size of the unit screen and by considering the numbers of apertures of the input optics and of the conjugation elements.

For example, from the size of the eye pupil and a determined number of apertures of a unit projector, the value of the focal length of the collimation element is defined.

From predetermined positions of the conjugation element 106 and the input optics 105, the focal length of the conjugation element 106 is defined such that the collimation element is the conjugate of the input optics 105 by the conjugation element 106.

From the size of the eye pupil and the focal length of the collimation element 107, the size of the intermediate image formed in the object focal plane of the collimation element 107 is determined. From the focal length of the conjugation element 106, the size of the virtual intermediate image formed between the input optics 105 and the unit screen 1010 is deduced. Then, the size of the unit screen 1010 being known, the focal length of the input optics 105 is deduced therefrom.

According to a particular example (it has been assumed here again that the optical index of the optical guide is equal to 1):
- the unit screen 1010 has a width L of 5 mm;
- the distance between the optical axis of an input optics 105 and the optical axis of the associated collimation element 107 is about 50 mm;

the input optics has a focal length of 24.72 mm and a diameter of 3.92 mm;

the light guide has an index of 1.887 at 450 nm, and a thickness of 5 mm;

the conjugation element 106 has a focal length of 8.86 mm and a diameter of 11.4 mm;

the collimation element 107 has a focal length of 15.14 mm and a diameter of 9.46 mm;

the unit projector has a number of apertures of 1.6; and the eye pupil 104 is a disk with a diameter of 5 mm located at 10 mm from the face 1031.

Figure 4:
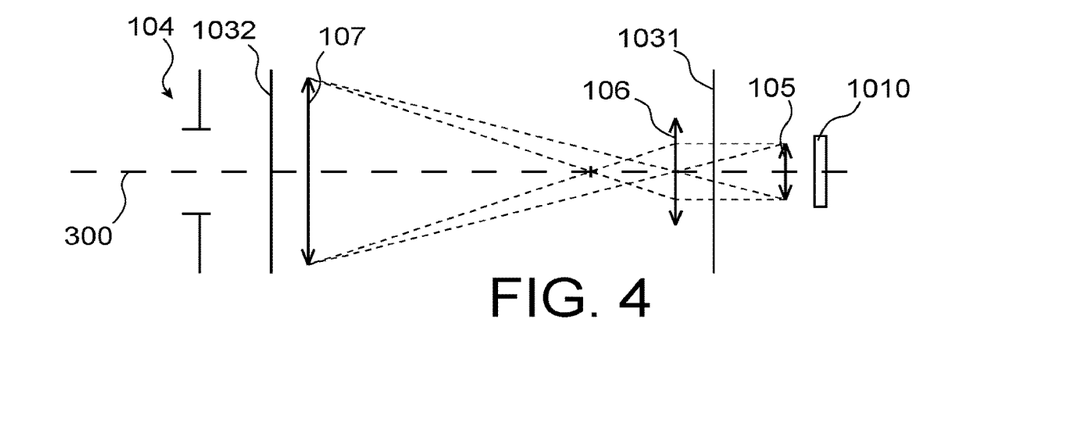
FIG. 4 schematically illustrates the pupillary conjugation implemented in a part of an optical device and system according to FIG. 2.

FIG. 4 schematically illustrates the pupillary conjugation implemented in a unit projector as previously defined.

The entrance pupil of the unit projector is formed by the input optics 105. The exit pupil of the unit projector is formed by the collimation element 107. The exit pupil is the conjugate of the entrance pupil by the conjugation element 106. In other words, let the input optics 105 form an object, the location and the size of the image of this object coincides with the location and the size of the collimation element 107.

This conjugation relationship makes it possible to get rid of any crosstalk phenomenon between the unit projectors and systems. If a light ray passes through an input optics 105, and then arrives on a conjugation element 106 associated with a neighbouring unit projector, the conjugation relationship defined above enables this ray to be sent off the location intended to receive the eye pupil. Said ray comes from the unit screen associated with said input optics 105.

Figure 5:
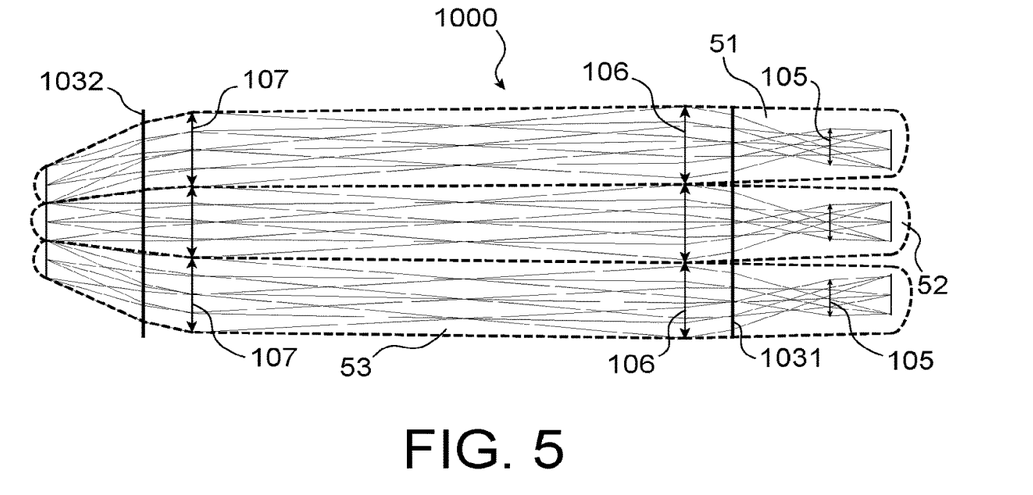
FIG. 5 schematically illustrates light ray paths in an optical device and system according to FIG. 2.

FIG. 5 schematically illustrates light ray paths in an optical device and system as represented in FIG. 2. FIG. 5 corresponds to FIG. 3A, but illustrates the three unit systems 51, 52, 53 of the optical system 1000 illustrated in FIG. 2. FIG. 5 also illustrates the three unit projectors, such that a unit projector and a unit screen form together a unit system.

Figure 6A:
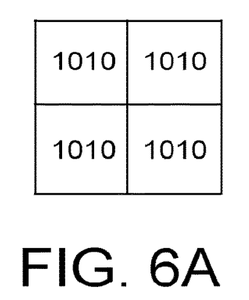
FIGS. 6A and 6B schematically illustrate a distribution of the unit projectors according to the invention.
Figure 6B:
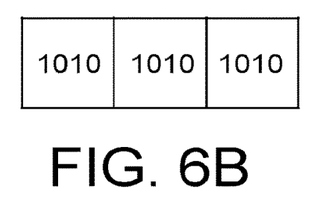

FIGS. 6A and 6B schematically illustrate a distribution in the unit projectors and systems according to the invention. It is seen that the unit projectors and systems can be juxtaposed along two space dimensions (FIG. 6A) or along a single dimension (FIG. 6B and FIGS. 2 and 5).

Figure 7:
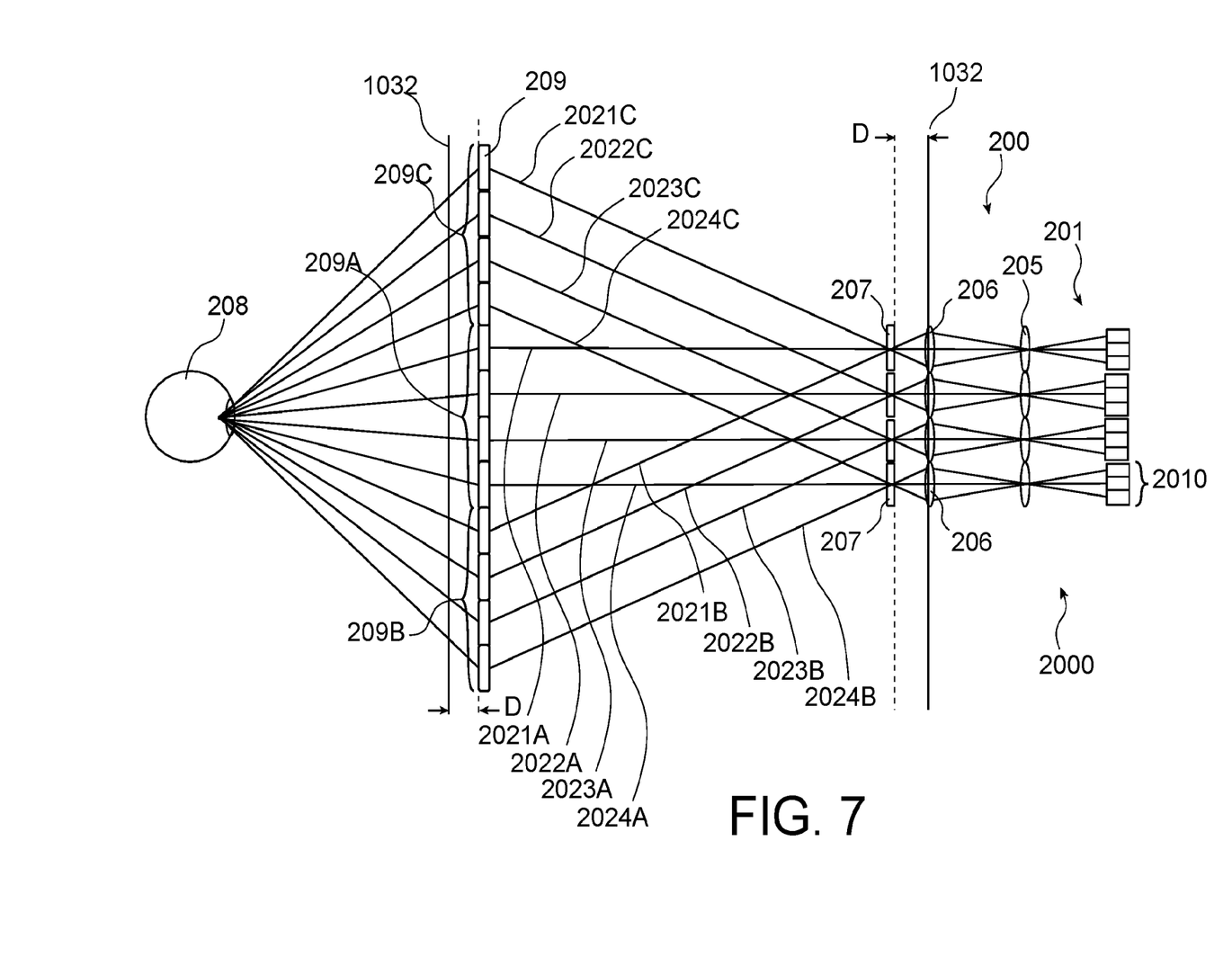
FIG. 7 illustrates a second embodiment of an optical projection device and system according to the invention.

FIG. 7 illustrates a second embodiment of the optical device 200 and optical system 2000 according to the invention.

The optical device 200 is represented according to an unfolded view, that is the internal reflections in the light guide are unfolded to represent light beams extending along straight lines.

As in the first embodiment, the screen 201 consists of several unit screens 2010.

The optical device 200 comprises a light guide with a thickness D, similar to that previously described about the embodiment of FIG. 2. Since the view of FIG. 7 is an unfolded view, the input and output face 1031 as passed through for the first time by the light beams coming from the screen, and the opposite face 1032 as passed through one last time by the light beams from the screen have been represented.

The optical device 200 comprises input optics 205, similar to those described with respect to the first embodiment of the invention.

It also comprises conjugation means, formed by several conjugation elements 206. The conjugation elements 206 can be located between the input optics 205, and the face 1031 of the light guide, for example directly adjacent to this face, adjoining the same. Alternatively, the conjugation elements 206 can be formed integrally with the light guide, and plated on this face.

The conjugation elements 206 according to the second embodiment of the invention differ from the conjugation elements 106 according to the first embodiment of the invention, in that they consist this time in microlenses. Further, they operate in transmission for this time.

The optical device 200 then comprises collimation elements 207, formed or directly bonded on a face of the light guide. They can in particular be formed or bonded on the face 1032 of the light guide, each collimation element 207 being in front of a unit screen 2010.

The collimation elements have advantageously a deflection function, in addition to their optical power function. The aim is to initiate guiding in the light guide of the light beams from the unit screens and that have passed through the input optics and the conjugation means. Such a deflection is described hereinbefore, regarding FIG. 2 and the conjugation means 106. Alternatively, distinct components perform this deflection function.

The input optics 205, conjugation elements 206 and collimation elements 207 according to the second embodiment of the invention have the same conjugation relationships to each other as the input optics 105, conjugation elements 106 and collimation elements 107 according to the first embodiment of the invention. In this regard, FIGS. 3A, 3B, 4, and 5 could be referred to, with the difference that the faces 1031 and 1032 represented on these figures should be moved to be placed as in FIG. 7.

As in the first embodiment, this second embodiment implements several unit projectors sharing a same light guide and each implementing a pupillary conjugation avoiding crosstalk phenomena.

A unit screen corresponds to each unit projector, the whole forming a unit system.

Each unit projector propagates a small portion of a total field. According to the second embodiment as illustrated in FIG. 7, the field distribution is as follows: the light guide is associated with a limit field of X°, for example 20°. These X° define a unit field.

For example a total field of N*X° is desired, for example 40° or 60° or more. In FIG. 7, there is N=3. Let M be a number of unit projectors and systems. In FIG. 7, there is M=4.

On each unit screen, N zones, that is 3 zones herein are defined. In particular, each zone corresponds to a pixel of the unit screen. Here, each unit screen thus comprises three pixels. The unit screens each comprise a same number of pixels.

By "channel", it can be meant the optical path associated with a unit field. Each channel gathers light beams from each of the unit screens. In particular, each channel gathers light beams from the same respective pixel on each of the unit screens. In FIG. 7, a channel corresponds to the light beams from the upper pixels of the unit screens, a channel corresponding to the light beams from the center pixels of the unit screens, and a channel corresponds to the light beams from the lower pixels of the unit screens. The pixel resolution for each channel is thus determined by the number of unit projectors. In FIG. 7, there are M=4 unit projectors, such that the image resolution at the output of the optical device 200 according to the invention is M=4 pixels per channel, that is M=4 pixels per X=20° of field.

In each unit projector, after passing through the collimation element 207, the light beams associated with each of the three pixels are spatially deviated from each other. The light beams 2021A, 2022A, 2023A, 2024A associated with the respective center pixels of the unit screens are then propagated in parallel to each other. The light beams 2021B, 2022B, 2023B, 2024B associated with the respective lower pixels of the unit screens are then propagated in parallel to each other. The light beams 2021C, 2022C, 2023C, 2024C associated with the respective upper pixels of the unit screens are then propagated in parallel to each other.

Figure 8A:
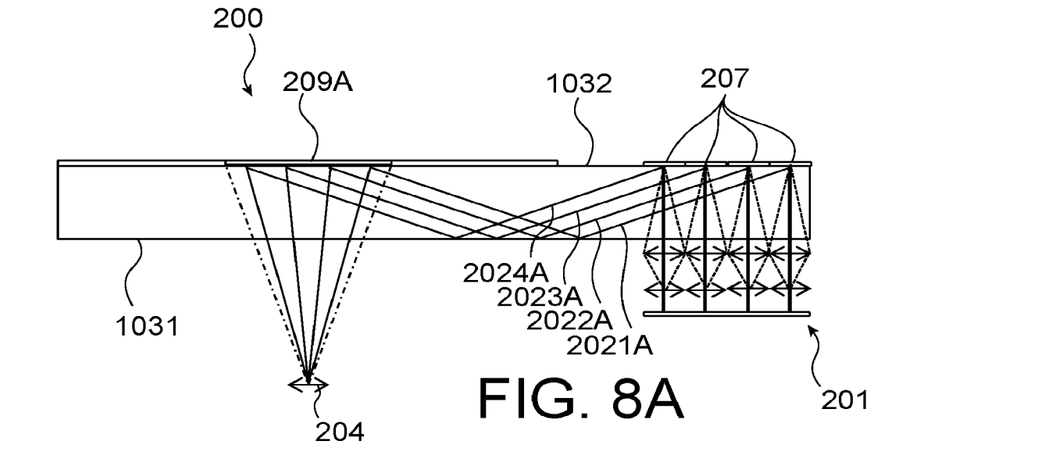
FIGS. 8A to 8C schematically illustrate light ray paths in an optical device and system according to FIG. 7.
Figure 8B:
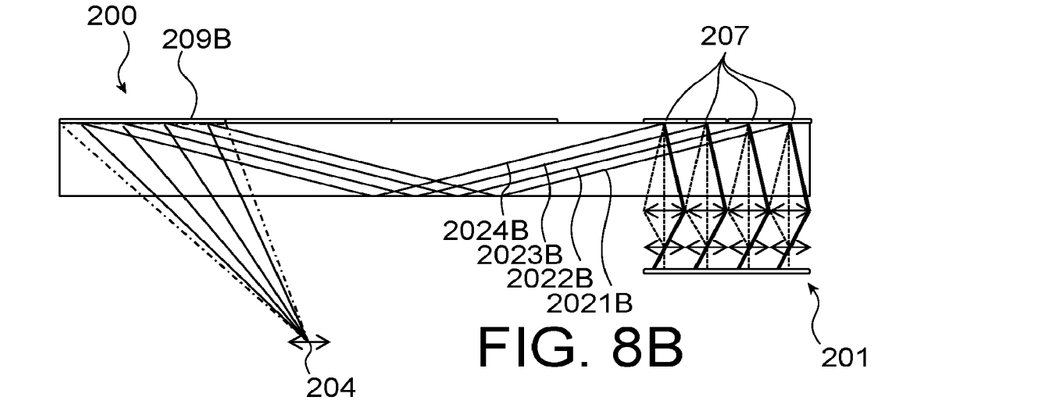
Figure 8C:
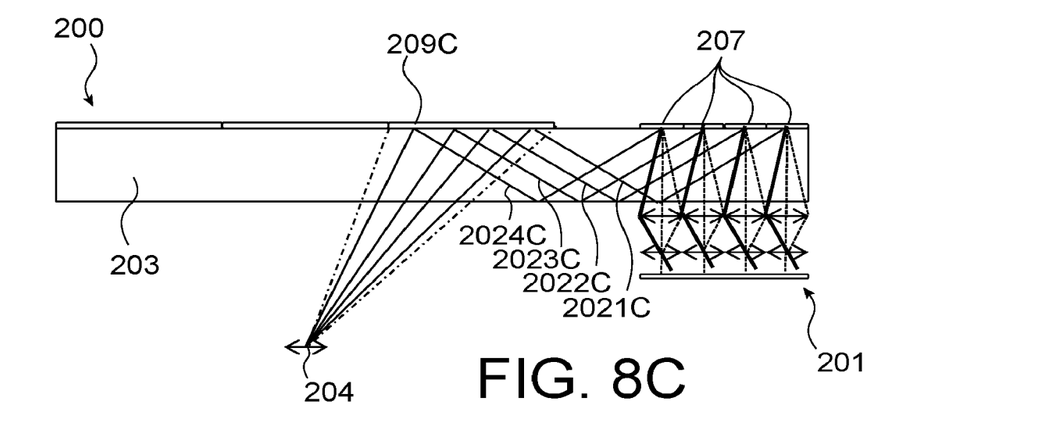

FIGS. 8A to 8C illustrate the optical device and system according to a non-unfolded view.

FIG. 8A represents more particularly the light beams 2021A, 2022A, 2023A and 2024A, which form together a central channel corresponding to a central portion of the total field at the output of the optical device 200 according to the invention. The eye is modelled by a lens 204. Each of the beams reaches a decoupling component belonging to a central assembly 209A of decoupling components 209 (see also FIG. 7). Each decoupling component has a deflection function, and is arranged to deflect the light beam it receives, so that it comes out of the light guide to reach the location suitable for receiving the user's eye. The decoupling components have no power function, and are thus easy to make. They can consist of an element from a hologram, a diffraction grating or a semi-transparent plane mirror. The decoupling components are located on a face of the light guide, herein the face 1032, in front of a location provided for the eye pupil.

In FIG. 8B, the light beams 2021B, 2022B, 2023B and 2024B are more particularly represented, forming together a left side channel corresponding to a left side portion of the total field at the output of the optical device 200 according to the invention. Each of these beams reaches a decoupling component belonging to a left side assembly 209B of decoupling components.

In FIG. 8C, the light beams 2021C, 2022C, 2023C and 2024C, are more particularly represented, forming together a right side channel corresponding to a right side portion of the total field at the output of the optical device 200 according to the invention. Each of these beams reaches a decoupling component belonging to a right side assembly 209C of decoupling components.

Thus, each decoupling component 209 is associated with a pixel of a unit screen, and to each unit screen correspond as many decoupling components 209 as there are pixels. Each decoupling component is arranged to deflect off the light guide a light beam from the unit screens, having passed through the input optics, the conjugation means and collimation means, and having propagated in the light guide.

Each pixel of a unit screen is associated with a single decoupling component, having a deflection function distinct from the deflection functions of the other decoupling components.

Each assembly 209A, 209B, respectively 209C of decoupling components gathers decoupling components associated with each of the unit screens. The assemblies 209A, 209B, 209C do not share decoupling components in common. In each assembly, there is only one single decoupling component associated with a given unit screen.

The assemblies 209A, 209B, 209C are juxtaposed to each other, arranged edge-to-edge. Each assembly 209A, 209B or 209C gathers edge-to-edge decoupling components.

If a decoupling component is defined by the input optics with which it is associated, the assemblies 209A, 209B, 209C have all the same distribution of the decoupling components.

Preferably, when injected in the light guide, the light beams associated with each of the pixels are deflected so as to reach the adapted decoupling component.

It is noticed that the spatial distribution of the pixel on the screen 201 does not coincides with the spatial distribution of the light beams associated with each of these pixels, at the location provided for the eye pupil. The image formed on the screen 201 does not correspond to the image that will be seen by a user. The image formed on the screen 201 should thus be suitable for the optical system 200 according to the invention, as a function of the image desired to be projected at the output of this system. Further, this implies a complex decoupling function implemented by the assemblies of deflection elements.

According to the second embodiment, the conjugation means can be formed by microlenses. The use of microlenses gives access to very low focal distance values, for example lower than 8 mm, or even lower than 5 mm. Thus, unit screens 2010 with reduced dimensions can be used, without compromising the numerical aperture of the unit projectors. Indeed, it can be shown that the focal distance of a unit projector decreases when the size of the unit screen decreases, but that this decrease can be compensated for by a decrease in the diameters of the elements being part of the combination.

Thanks to the use of microlenses to form the conjugation means, the optical device and system according to the invention can thus be further miniaturized. The overall space of the unit screens can in particular be decreased by decreasing the field or resolution.

For example, the conjugation elements have a focal length lower than 1 mm, for example lower than 100 µm, for a diameter lower than 1 mm, for example lower than 100 µm. The unit screens can thus have pixels with a dimension lower than 1 µm, for a total size lower than 5 mm side.

The collimation elements 207 can be wholly reflecting, even for a use in an augmented reality viewing device, because they are not necessarily in front of the location provided for the eye pupil 208. The fact that one collimation element 207 is not in front of the location provided for the eye pupil 208 increases the so-called eye-relief distance of the optical device according to the invention. This slightly decreases the numerical aperture of this optical projection device, but the optical channels are smaller and thus higher in number than for the first embodiment; the portions of field treated by each channel are thus smaller, which makes the assembly much less sensitive to the impact of the eye distance on the number of apertures.

According to the embodiment of FIG. 7, the unit screens are advantageously formed by zones of a same screen. However, numerous pixels of the screen then can not be imaged. In other words, the zones corresponding to unit screens are not edge-to-edge. Indeed, the width of the conjugation elements 206 is much higher than the width of the input optics 205, which forms blind zones between two input optics 205.

Figure 9:
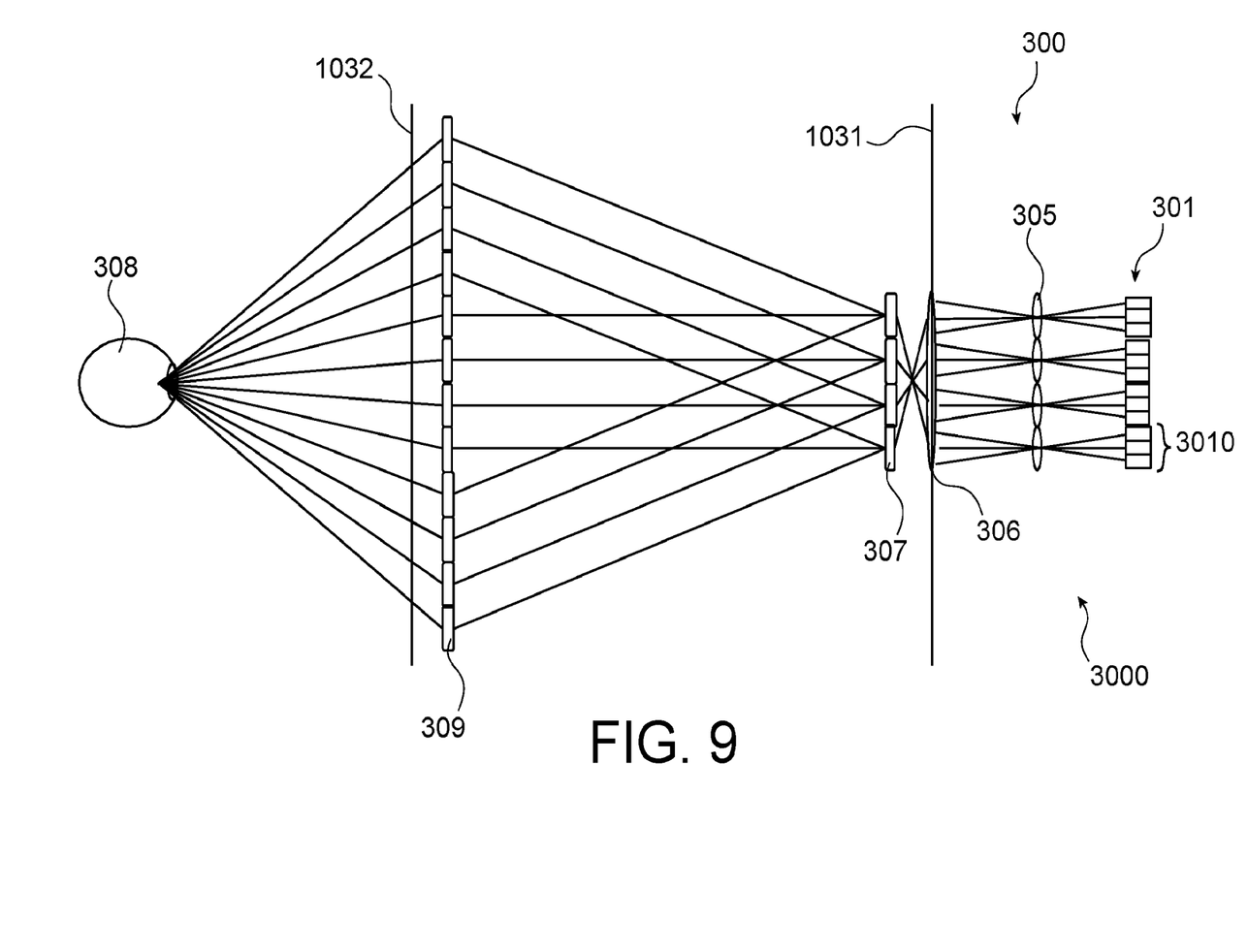
FIG. 9 illustrates an alternative of the optical device and system according to FIG. 7.

FIG. 9 presents an alternative embodiment to FIG. 7, enabling this drawback to be overcome. The reference signs of FIG. 9 correspond to those of FIG. 7, by replacing the first digit of each number by a three. According to the alternative represented in FIG. 9, the several distinct conjugation elements 206 are replaced by a single lens 306 which enables the input optics to be disposed edge-to-edge and thus the loss of pixels to be limited. For a same overall space, there can further be more unit projectors. Thus, with an equal overall space, the resolution associated with each channel can be improved. The deflection function making the injection of light beams in the light guide is however complexified.

The invention claimed is:

1. An optical projection device for a display, comprising an optical guide, wherein the optical projection device comprises:

at least two refractive input optics, arranged in front of an input zone of the optical guide;

at least two collimation elements having a deflection function, each collimation element being associated with an input optics, and located directly on a face of the optical guide; and conjugation device disposed between the input optics and the collimation elements, wherein a respective one of the at least two input optics and a respective one of the at least two collimation elements form a pair, the conjugation device being arranged to optically conjugate each of the respective input optics and the associated collimation element, wherein each of the collimation elements has an optical power function and forms a unit projector with the associated input optics and a corresponding part of the conjugation device.

2. The optical device according to claim 1, wherein the conjugation device is located directly on a face of the optical guide.

3. The optical device according to claim 2, wherein the input zone is located on a first face of the optical guide and the collimation elements are at least partly reflecting and located on a second face of the optical guide opposite to this first face.

4. The optical device according to claim 2, wherein the conjugation device comprise at least two conjugation elements, each associated with an input optics and a collimation element.

5. The optical device according to claim 4, wherein each conjugation element comprises one element from a hologram, a diffraction grating, a mirror or a Fresnel lens, a lens or a non-plane mirror.

6. The optical device according to claim 2, wherein the conjugation device are arranged to deflect light beams that have passed through the input optics, so as to initiate the guiding thereof in the optical guide.

7. The optical device according to claim 2, wherein the collimation elements are arranged to deflect, off the optical guide, light beams that have passed through the input optics and the conjugation device, and that have propagated in the optical guide.

8. The optical device according to claim 2, wherein each collimation element comprises an element from a hologram, a diffraction grating, a mirror or a Fresnel lens, a lens or a non-plane mirror.

9. The optical device according to claim 1, wherein the conjugation device operate in transmission and are located between the input optics and a first face of the optical guide, or directly on this first face, said input zone being located on said first face.

10. The optical device according to claim 9, wherein the collimation elements are located directly on a face of the optical guide.

11. The optical device according to claim 9, wherein the collimation elements are arranged to deflect the light beams that have passed through the input optics and the conjugation device, so as to initiate the guiding thereof in the light guide.

12. The optical device according to claim 9, wherein the conjugation device include at least two microlenses, each associated with an input optics.

13. The optical device according to claim 9, wherein the conjugation device consist of a single lens common to each of the input optics.

14. The optical device according to claim 9, further comprising decoupling components located on a face of the optical guide and arranged to deflect, off the optical guide, light beams that have passed through the input optics, the conjugation device and the collimation element, and that have propagated in the optical guide.

15. An optical projection system comprising an optical projection device according to claim 1, as well as a screen comprised of a plurality of unit screens, each unit screen being associated with an input optics and with the corresponding collimation element, and each unit screen being arranged such that:

the optical guide performs propagation of light beams from each of the unit screens; and each collimation element performs the collimation of a light beam from a unit screen, and that has passed through the associated input optics and the conjugation device.

16. The optical device according to claim 2, wherein the conjugation device and the collimation elements are each located directly on the same face of the optical guide.

* * * * *